United States Patent [19]
Olson

[11] 3,962,925
[45] June 15, 1976

[54] BI-DIRECTIONAL RATCHET DRIVE MECHANISM

[75] Inventor: George E. Olson, Arlington Heights, Ill.

[73] Assignee: A. O. Smith Harvestore Products, Inc., Arlington Heights, Ill.

[22] Filed: Dec. 9, 1974

[21] Appl. No.: 531,042

[52] U.S. Cl. .................................................. 74/143
[51] Int. Cl.² ........................................ F16H 27/02
[58] Field of Search .............. 74/128, 142, 577, 575

[56] References Cited
UNITED STATES PATENTS

| | | | |
|---|---|---|---|
| 41,574 | 2/1864 | Groel | 74/577 |
| 839,957 | 1/1907 | Reiss | 74/128 |
| 3,136,167 | 6/1964 | Mörner | 74/128 |
| 3,398,591 | 8/1968 | Arko | 74/142 |
| 3,678,769 | 7/1972 | Holzer | 74/142 |
| 3,683,711 | 8/1972 | Bowman | 74/142 |

*Primary Examiner*—Samuel Scott
*Assistant Examiner*—Wesley S. Ratliff, Jr.
*Attorney, Agent, or Firm*—Andrus, Sceales, Starke & Sawall

[57] ABSTRACT

A push arm assembly for eccentrically operating a ratchet gear by means of a driving pawl to rotate an unloader arm in the bottom of a silo or the like. Directional change of the driving pawl is accomplished by withdrawing the driving pawl into its housing and rotating it 180° and then releasing it to place the pawl in engagement with the ratchet to drive the latter in the predetermined forward or reverse rotation. The driving pawl also can then be rotated 90° into a position out of engagement with the ratchet when rotation of the unloader arm is not desired. A holding pawl is also employed in conjunction with the driving pawl to restrain the ratchet during the period of oscillation when the driving pawl disengages the ratchet and recedes to engage the next tooth on the ratchet. Directional change of the holding pawl and disengagement from the ratchet is accomplished in the same manner as the driving pawl.

3 Claims, 11 Drawing Figures

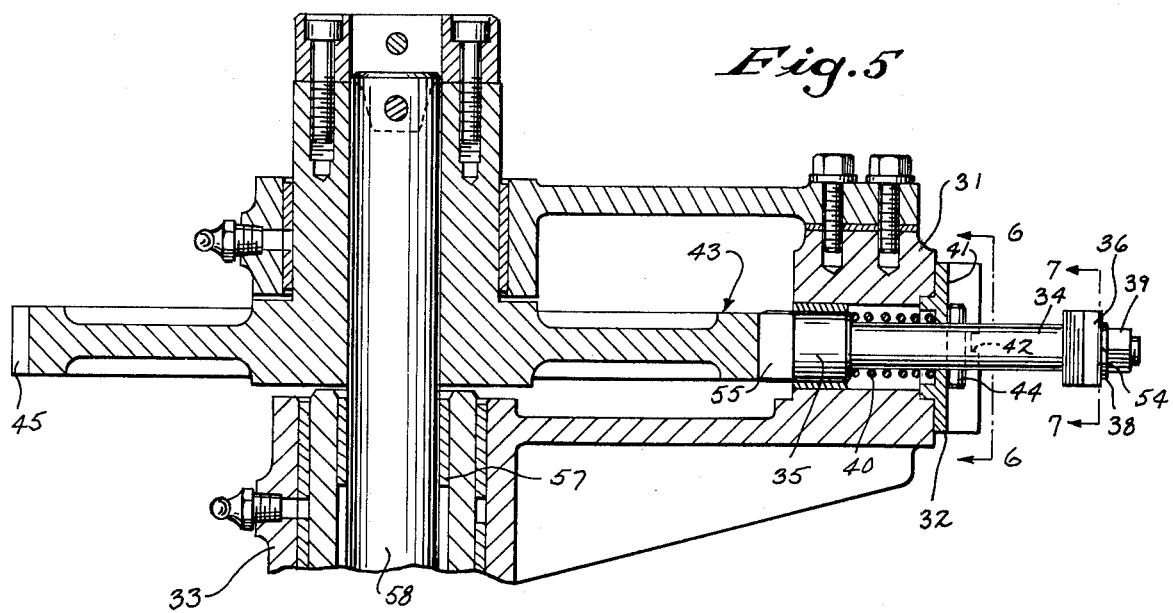
Fig. 5
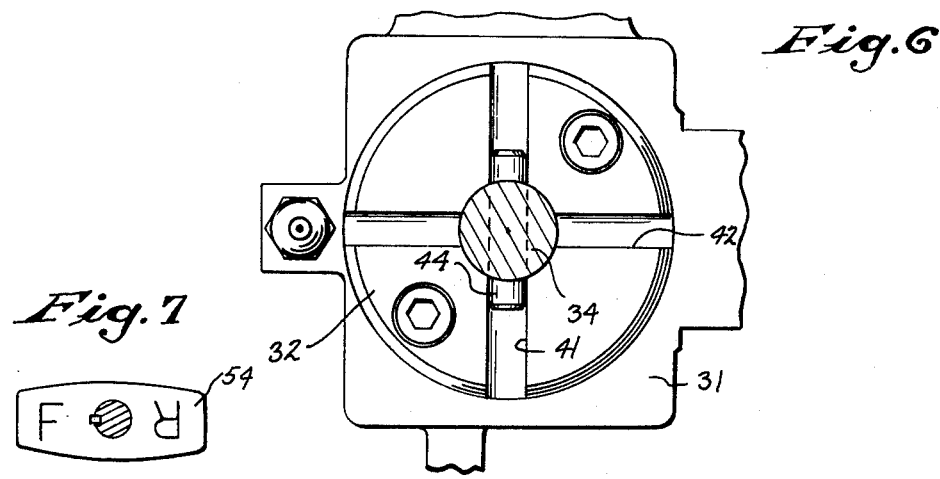
Fig. 6
Fig. 7
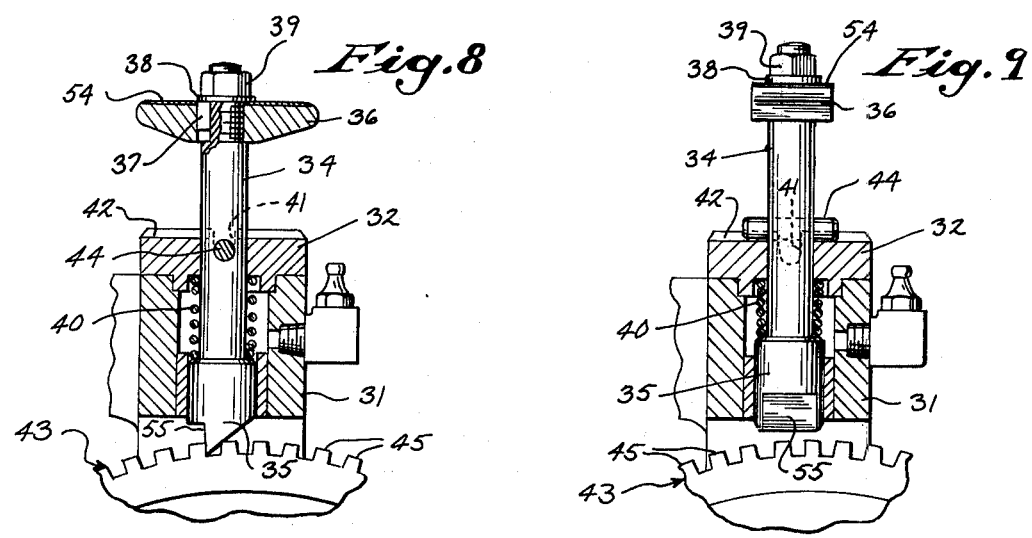
Fig. 8
Fig. 9

BI-DIRECTIONAL RATCHET DRIVE MECHANISM

BACKGROUND OF THE INVENTION

Pawls have been used previously to eccentrically drive ratchet gears in a forward or reverse direction. The spring loaded driving pawl of this invention has the capability of being disengaged from the ratchet and manually rotated 180° to accomplish forward or reverse driving of the ratchet wheel. In addition the driving pawl can be completely disengaged from the ratchet wheel and rotated to a neutral position in which the ratchet is not driven. As applied to a cutter arm of a bottom unloader employed in a silo or the like, this permits load relief on the cutter arm to facilitate easier start up of the arm. A holding pawl also is operable in the same manner as the driving pawl. The tooth of each of the pawls is off center with respect to the center line of each ratchet gear tooth which allows the teeth of the pawl to engage the opposite faces of each tooth of the ratchet when rotated 180° to drive the ratchet in a forward or reverse direction.

SUMMARY OF THE INVENTION

The apparatus of the invention has a spring loaded push arm assembly which is eccentrically reciprocated to drive a driving pawl in engagement with a ratchet. The ratchet upon rotation drives a shaft and gear assembly which is connected to the arm of a bottom unloader to rotate the arm in the bottom of a silo to effect discharge of the stored material from the silo.

The particular feature to which the invention is directed relates to the driving and holding pawls. The driving pawl has a pawl shaft on the inner end of which is secured a tooth adapted to engage complementary teeth provided on the outer circumference of the ratchet. The shaft extends outwardly through a housing and a detent plate and at the outer end a handle is secured to the shaft for ready grasping and lifting and rotation of the shaft and driving pawl connected thereto.

The shaft is spring biased within the housing and may be rotated or moved longitudinally within the housing by the handle at the outer end. The detent plate at the outer face has a relatively deep slot which extends through the face of the plate. The slot receives a roll pin which extends through the shaft to hold the tooth of the pawl in either forward or reverse driving engagement with the ratchet. The driving pawl is manually lifted and rotated 180° to accomplish the forward or reverse drive of the ratchet. In addition a shallow slot is provided in the outer face of the detent plate 90° offset from the deep slot within which the roll pin can be located and extends through the pawl shaft. In this latter position the driving pawl is completely disengaged from the ratchet and the ratchet is then not driven with the result that the unloader arm on the bottom unloader is not rotated.

The holding pawl which prevents rotation of the ratchet is located on the opposite side of the ratchet from the driving pawl and its construction is the same as that of the driving pawl. Similarly it can be rotated to a forward, reverse or disengaged position with respect to the ratchet.

The forward or reverse position of both of the pawls with respect to rotation of the ratchet is made possible because the driving face of the tooth of each pawl is off center with respect to the center line of each tooth on the ratchet gear which permits the pawl to engage the opposite face of each gear tooth when rotated.

DESCRIPTION OF THE DRAWINGS

FIG. 5 is a sectional view taken on line 5—5 of FIG. 3;

FIG. 6 is a sectional view through the holding pawl taken on line 6—6 of FIG. 5;

FIG. 7 is a sectional view taken on line 7—7 of FIG. 5 to illustrate the letters showing whether the pawl is in a reverse or forward driving position;

FIG. 8 is a view in section and elevation of the driving pawl in reverse driving position;

FIG. 9 is a view in section and elevation of the driving pawl in a neutral position disengaged from the ratchet;

DETAILED DESCRIPTION OF THE INVENTION

Figure 1:
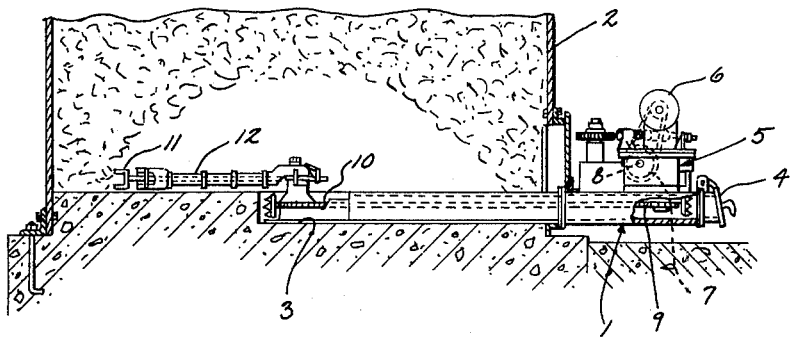
FIG. 1 of the drawing is a sectional view through a silo illustrating in elevation the unloader arm and other parts of the driving mechanism.
Figure 10:
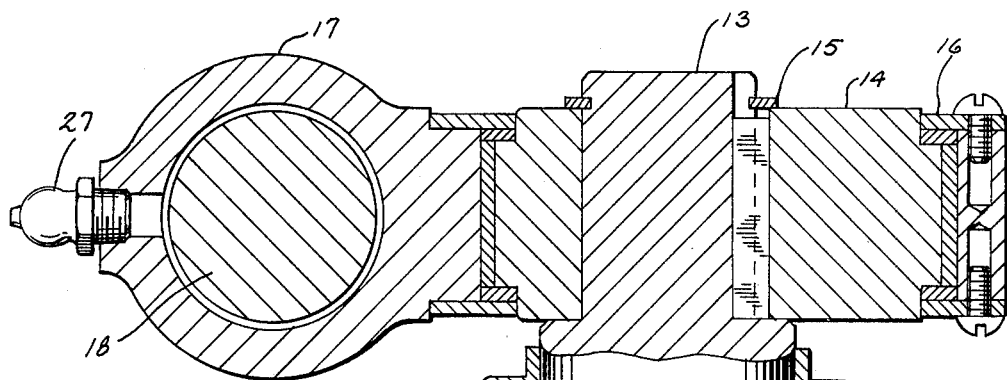
FIG. 10 is a sectional view with parts in elevation of the eccentric and housing connecting the same thereto to the push arm taken on line 10—10 of FIG. 4.
Figure 11:
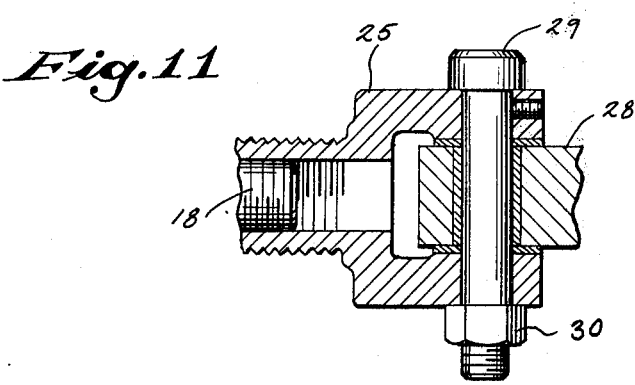
FIG. 11 is a sectional view illustrating the connection of the push arm to the pawl assembly.
Figure 2:
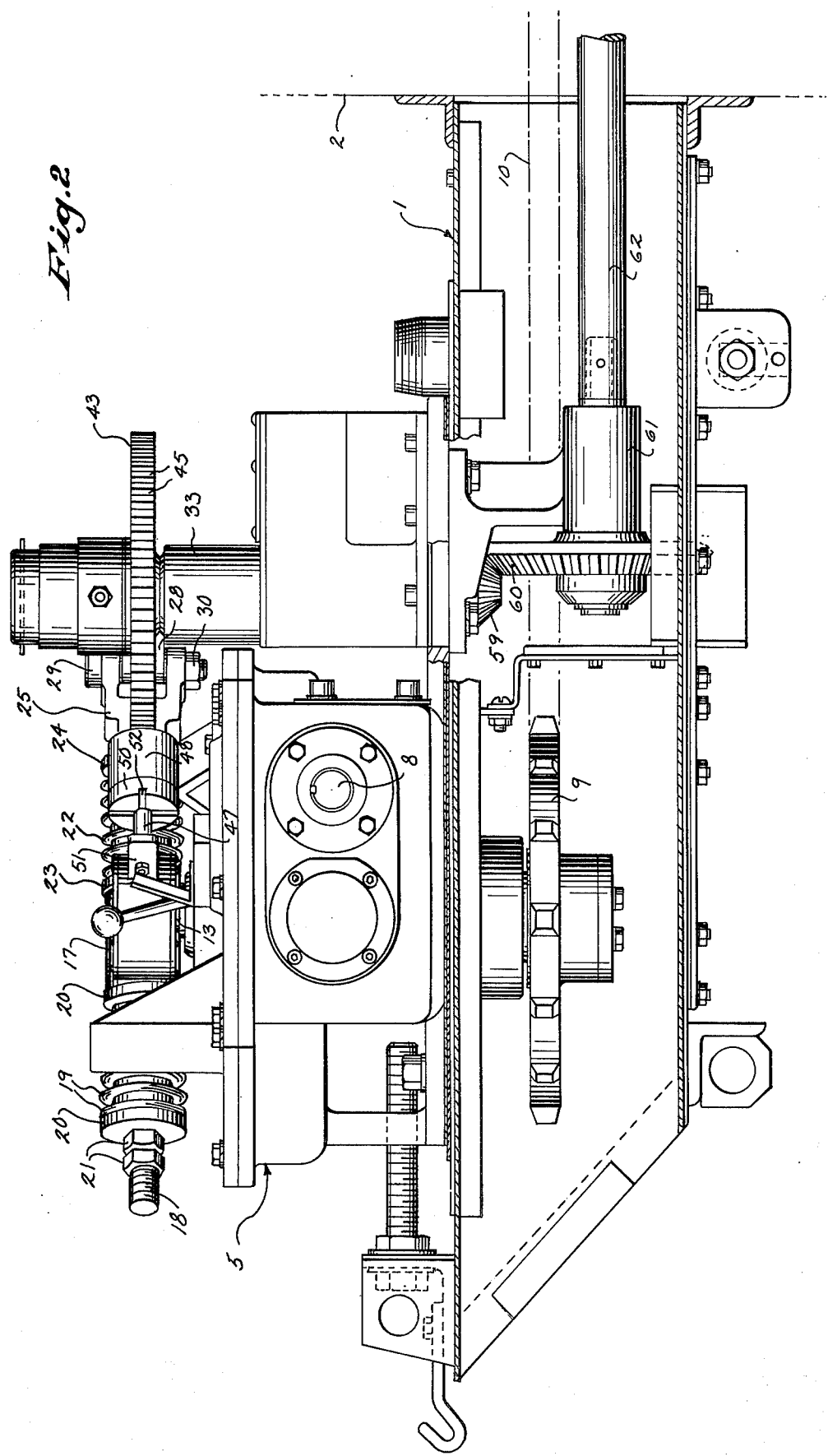
FIG. 2 is an elevational view with parts in section of the push arm assembly applied to the drive for an unloader arm.

Referring to FIGS. 1 and 2 of the drawing there is illustrated an unloader housing 1 part of which is located outside the storage structure or silo 2 in registry with the trough 3 located inside the bottom of silo 2 to receive and outwardly conduct the material to be discharged from the structure. The outer end of the housing 1 is closed by the door 4 when material is not being discharged.

The housing 1 also serves to support the transmission housing 5 and the reversible electric motor 6.

Figure 3:
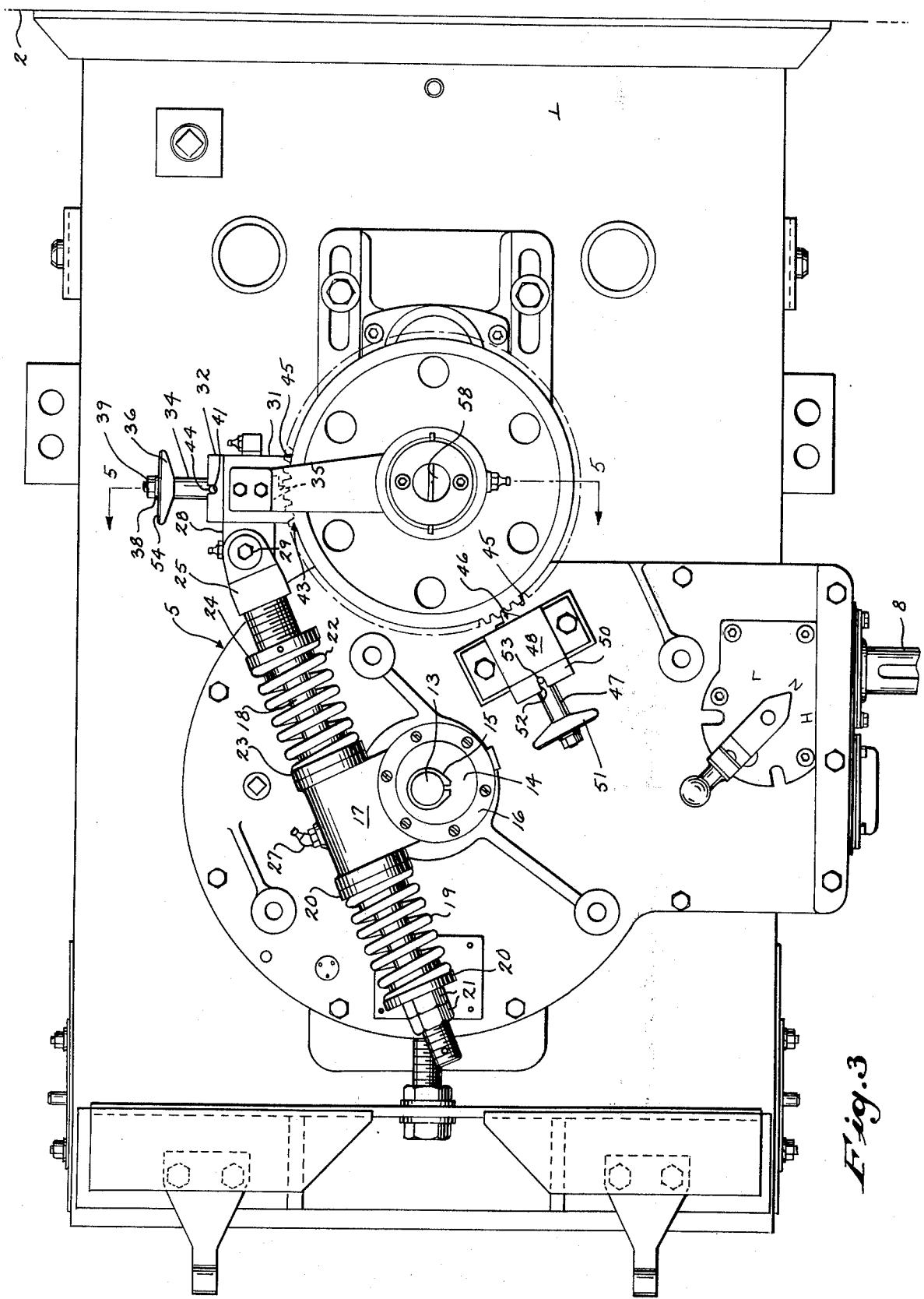
FIG. 3 is a top plan view of the push arm assembly and driving and holding pawl of the invention with the pawls in forward driving position.

The motor 6 serves to drive sprocket 7 as can be observed in FIG. 1, and the shaft 8 illustrated in FIG. 3 which is connected to sprocket 7, and then through the driving mechanism, not shown, located in the transmission housing 5 to drive the sprocket 9 to actuate the discharge conveyer chain 10 shown in FIG. 1 and in dotted lines in FIG. 2. The chain 10 through gears and a shaft, not shown, also rotates the cutter chain 11 on the cutter arm 12 located in the bottom of silo 2. For a more complete description of the silo unloader with which the invention is employed reference may be made to U.S. Pat. No. 2,675,931 issued Apr. 20, 1954 to Lawrence Makous and assigned to A. O. Smith Corporation, the parent company of the assignee of the present invention.

It is essential that the cutter arm 12 inside the silo 2 be rotated separately independently of the drive for the cutter chain 11 on the arm and the discharge conveyer chain 10.

The motor 6 through a different set of gears, not shown, located in transmission housing 5 drives the shaft 13 which rotates the eccentric disc 14 which is secured to key 15 and a retaining plate 16.

Eccentric 14 is secured to the collar 17 which is assembled with a slip fit on push rod 18 and eccentrically drives the collar 17 back and forth on rod 18 intermittently.

A coil spring 19 is assembled over the rear portion of push rod 18 between a pair of longitudinal spaced flanged washers 20. The innermost washer 20 abuts the collar 17 while the outermost washer 20 is held under tension by a pair of jam nuts 21 which are threaded onto the outer free end of push rod 18.

A second coil spring 22 is assembled over the forward portion of push rod 18 between a flanged washer 23 which abuts the collar 17 and a flanged washer 24 which is threaded onto a clevis 25 in turn threaded onto the inner end of the push rod 18. A lock nut 26 is also threaded onto the inner end of rod 18 inside the clevis 25 to fix the position of the clevis 25 on the end of push rod 18.

Lubrication of collar 17 for longitudinal movement on push rod 18 is accomplished through the fitting 27 secured to collar 17.

The clevis 25 is secured to the lever 28 by the bolt 29 which extends through the arms of clevis 25 and lever 28 and is held in place by the nut 30. The lever 28 is provided as part of the pawl housing 31 which is hollow on the inside and includes the detent plate 32 at the upper end which closes the upper end of the body of housing 31 and is bolted thereto. The lower portion of the pawl housing 31 is journaled to the ratchet gear housing 33 so that housing 31 is disposed to be rotatable within certain predetermined limits.

The pawl shaft 34 extends through housing 31 and detent plate 32 of housing 31. At the lower end of the shaft 34 a driving tooth or pawl 35 is provided as part of shaft 34. At the upper end the shaft 34 has a handle 36 which is secured thereto by key 37, lock washer 38 and nut 39. Pawl shaft 34 is movable longitudinal and may be rotated within the housing 31 by grasping the handle 36. A spring 40 located internally of the pawl housing 31 abuts the upper end of tooth 35 at the lower end formed by the abutment end of the tooth 35 being of greater diameter than shaft 34 and the detent plate 32 at the upper end so that the shaft 34 and tooth 35 are spring pressed under the tension of spring 40.

The detent plate or abutment 32 forming the top of housing 31, as may be observed in FIG. 6, has at the outer end a generally deep slot 41 which extends completely across the detent plate. Plate 32 also has a slot 42 of lesser depth located above slot 41 at right angles to slot 41 or 90° therefrom.

The pawl 35 on shaft 34 is employed upon the intermittent reciprocation of push rod 18 to drive the ratchet 43. As may be observed in FIG. 4, when the ratchet 43 is to be driven in a forward direction, a roll pin 44 is lodged in deep slot 41 and extends through the pawl shaft 34 to hold the pawl tooth 35 in driving engagement with the teeth 45 of ratchet 43.

In the event it is desired to reverse the direction of the drive ratchet 38, as in FIG. 8, the handle 36 on the upper end of the pawl shaft 34 is grasped by the operator to thereby lift pawl tooth 35 so that the detented roll pin 44 clears the detent plate 32 in order to rotate the shaft 34 180°. When the new position is reached the pawl shaft 34 is released to allow roll pin 44 to reengage the deep slot 41. In such position the pawl tooth 35 is in a position reversed from the position in FIG. 4 and upon reciprocation of push rod 18 rotates ratchet 43 in a reverse direction.

Should it be desirable that ratchet 43 not be driven upon reciprocation of push rod 18, the handle 36 is grasped by the operator and rotated to a position 90° from the latter described position so that roll pin 44 may then be lodged in the lesser depth or shallow slot 42 and in this neutral position the pawl tooth 35 will be disengaged from ratchet 43. The latter position of pawl tooth 35 is illustrated in FIG. 9.

Movement of ratchet 43 opposite to the direction of rotation by the driving pawl 35 is prevented by the holding pawl or tooth 46. The holding pawl 46 has the same construction as that of driving pawl 35 and includes the pawl or tooth 46 on the end of a pawl shaft 47 which extends through a housing 48 in turn secured to the transmission housing 5. Holding pawl 46 is pressed into engagement with the teeth 45 of ratchet 43 by a spring 49 disposed around shaft 47 inside of housing 48. The spring 49 at the bottom abuts the upper end of pawl 46 and at the top it abuts detent plate 50 which closes the upper end of housing 48. A handle 51 is secured to the outer end of pawl shaft 47 so that holding pawl 46 may be lifted and rotated when the driving pawl 35 is similarly lifted and rotated to drive the ratchet 46 in either a forward or reverse direction. The holding pawl 46 engages the teeth 45 of ratchet 43 to restrain the ratchet 43 during the period of oscillation that the driving pawl 35 disengages ratchet 43 and recedes to engage the next tooth 45 of the ratchet. A generally deep slot 52, indicated in dotted lines in FIG. 4, extends across the detent plate 50 and receives a roll pin 53 which extends through shaft 47 to hold the holding pawl 46 in the selected forward or reverse position to prevent backward movement of the ratchet 43. As in the case of the driving pawl 35, the holding pawl 46 may be lifted by handle 51 and rotated 180° and the pin 53 disposed in slot 52 when the driving pawl 35 is rotated to drive the ratchet 45 in an opposite direction from that previously selected. In addition the holding pawl 46 may be lifted and rotated 90° by handle 51 to a neutral position in which it is disengaged from the ratchet 43 and the roll pin 53 disposed in a shallow slot in the detent plate 50 of housing 48. The shallow slot is not shown in the drawings but it is the same as driving pawl slot 42 in FIG. 6.

In FIG. 8 the ratchet 43 is being driven in a reverse direction and the plate 54 secured to the top of the handle 36 of the driving pawl 35 will be in the position as illustrated in FIG. 7 of the drawings. In the forward rotating position of the driving pawl 35, as illustrated in FIG. 3, the letters F and R on the handle 36 will be reversed by rotation 180° of the handle 36. In a neutral position of handle 36, as in FIG. 9, the letters on plate 54 will be at 90° to their previous location.

The face 55 of the driving pawl 35 and face 56 of holding pawl 46 are offset with respect to the center line of each ratchet gear tooth 45 which allows them to engage the opposite faces of gear teeth 45 when in either a forward or reverse driving position.

Figure 4:
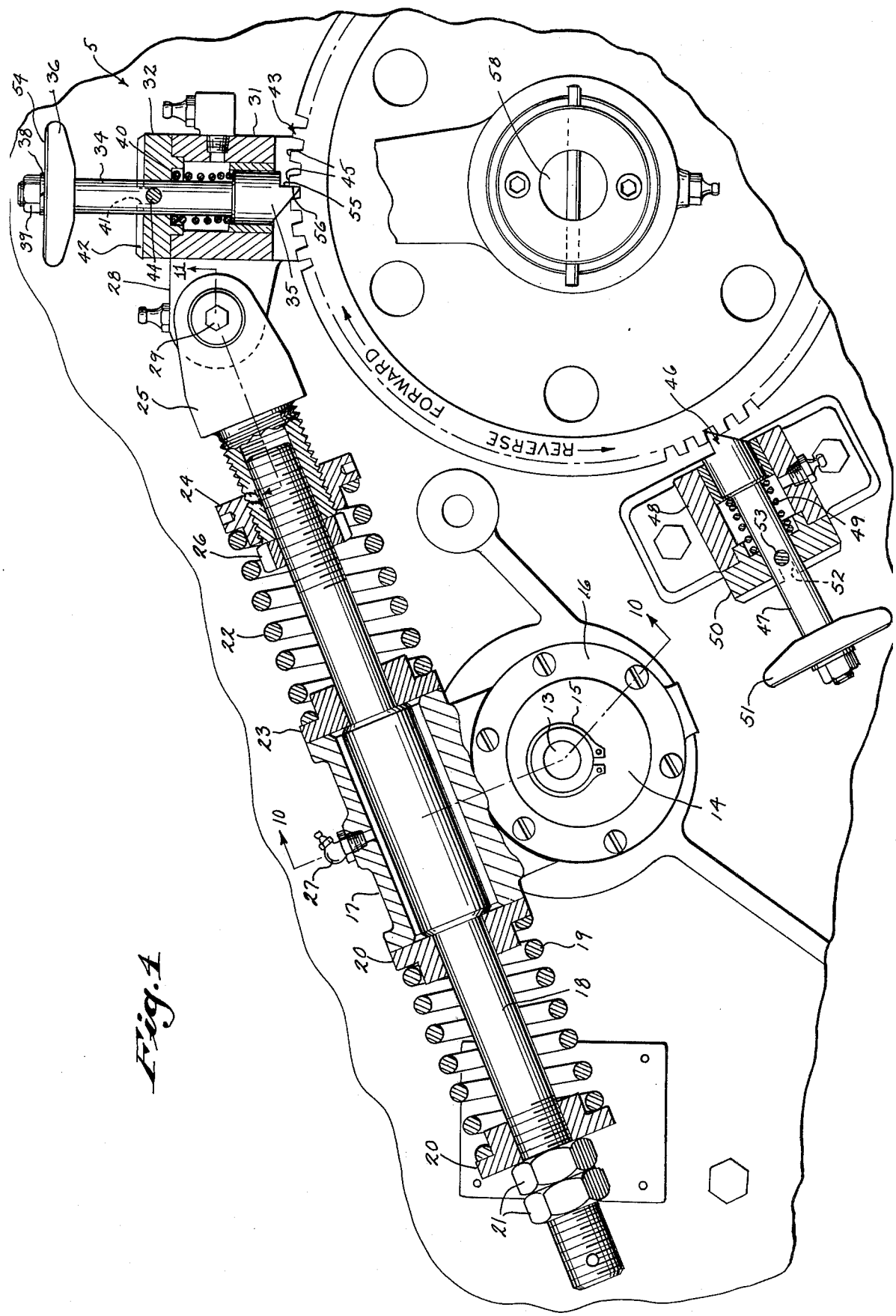
FIG. 4 is a sectional view with parts in elevation of the push arm assembly and the driving and holding pawl in section.

The ratchet 43 as illustrated in FIG. 4 is rotated by the driving pawl 35 within the bearing housing 57 and is secured to the vertical shaft 58 which is rotated by ratchet 43. Shaft 58 is connected to the bevel gear 59 at the lower end which meshes with the bevel gear 60. Bevel gear 60 through the gear box 61 rotates the shaft 62 which extends inside the silo 2 and rotates the cutter arm 12 through gears, not shown.

In the operation of the bi-directional ratchet mechanism described, the driving pawl 35 is actuated by a spring loaded push arm mechanism clevised to it. The driving pawl housing lever assembly is oscillated through an arc of one or more teeth on the ratchet 45 by means of an eccentric crank disc 14 housed in the push arm mechanism which converts the rotary motion of the transmission shaft 13 to linear displacement. The springs 19 and 22 on the push rod or arm 18 act as torque limiting members to provide intermittent rather than continuous rotary motion of the ratchet 43 thus providing protection to the complementary drive line members connected to drive the cutter arm 12.

Directional change of the driving and holding pawls by withdrawing them into their respective housings and rotating them 180° is possible because the faces 55 and 56 of pawls 35 and 46 respectively are off center with respect to the center line of the gear teeth 45 of the ratchet 43, thus permitting the pawls or teeth 35 and 46 to engage the opposite faces of each ratchet gear tooth 45.

The provision for holding the pawls out of engagement with ratchet 43 allows load relief on the cutter arm 12 or other device being driven against a load by the ratchet to facilitate easier start up.

Various modes of carrying out the invention are contemplated as being within the scope of the following claims particularly pointing out and distinctly claiming the subject matter which is regarded as the invention.

I claim:

1. A ratchet drive mechanism including a motor for rotating an arm or the like in a forward or reverse direction or disconnected therefrom to dispose the arm or the like in a non-rotating position, which comprises a pawl housing adapted to be reciprocated, a shaft extending through the pawl housing, a pawl secured to the lower end of said shaft and the shaft being free to be lifted and rotated within the pawl housing, a transmission housing, an eccentric disc located in the transmission housing and rotated by said motor, a collar secured to the eccentric disc and reciprocated intermittently thereby, a rod extending through the collar and pivoted at one end to the pawl housing, springs assembled on the rod on opposite sides of said collar, abutments secured to said rod and engaged by said springs to effect reciprocation of the rod upon intermittent movement of the collar on the rod to thereby reciprocate the pawl housing and the pawl carried thereby, a ratchet having a plurality of teeth on the outside circumference with the teeth being engaged by the pawl to rotate the ratchet intermittently as the pawl is reciprocated, means connecting the ratchet to said arm to rotate the arm, a spring surrounding the pawl shaft, abutment means confining the spring at opposite ends within the pawl housing to spring plunger the pawl into engagement with the ratchet, means on the outer end of the pawl shaft to lift the pawl shaft outwardly against the tension of the spring and rotate said shaft, a relatively deep slot provided in the outer portion of the abutment means, a generally shallow slot extending in the outer portion of the abutment means above the deep slot at an angle of 90° to said deep slot, a pin adapted to be lodged in the deep slot and extended through the pawl shaft to hold the pawl in engagement with the ratchet to rotate the ratchet in a forward direction upon reciprocation of the pawl and lodged in the deep slot after rotation of the pawl shaft 180° from its initial position and extended through the pawl shaft with the pawl engaging the ratchet to rotate the ratchet in a reverse direction and lodged in the shallow slot 90° from the last position of the pin and extended through the pawl shaft to hold the pawl in a neutral position out of engagement with the ratchet and thereby preventing rotation of said ratchet, and means engaging the ratchet to restrain movement of the ratchet opposite to that in which the ratchet is being driven and adapted to be placed out of engagement with the ratchet when the latter is not being rotated by the driving pawl.

2. In a mechanism for unloading stored material from silos and like storage structures wherein an unloading cutter arm upon which a cutter chain rotates to cut the material is normally rotated around the bottom of the structure by a motor, a driving assembly operated by said motor for actuating rotation of the cutter arm in forward or reverse rotation and adapted to be disposed in a non-operating position in which the cutter arm is not rotated, which comprises a ratchet connected to the cutter arm and adapted to rotate the arm when the ratchet is rotated, a reciprocating means driven eccentrically from said motor, means connecting the reciprocating means to a pawl housing, a pawl shaft spring mounted within the pawl housing to be plungered operated therein, a driving pawl secured to the inner end of the pawl shaft, means at the outer end of the pawl shaft to manually lift the shaft longitudinally and to rotate the same, a detent plate secured to the outer end of the housing, a relatively deep slot in the plate extending through the outer face of the plate, a shallow slot extending in the outer face of the plate at a 90° angle to the deep slot, and a pin adapted to be inserted through the pawl shaft and lodged respectively in the deep slot to hold the pawl in driving engagement with the ratchet in either a forward or reverse driving position, depending upon the position into which the shaft and pawl are rotated, and said pin being lodged in the shallow slot and extending through the pawl shaft to hold the pawl disengaged from the ratchet and thereby prevent rotation of the cutter arm by the ratchet upon reciprocation of the pawl, and a plungered holding pawl independent of the driving pawl extending in a pawl housing of the same construction as that for the driving pawl to engage the ratchet to restrain movement of the ratchet opposite to that to which the ratchet is being driven or rotated to a position to drive the ratchet and adapted to be placed out of engagement with the ratchet when the latter is not being rotated by the driving pawl.

3. The ratchet drive mechanism of claim 2, and the holding and driving pawls each having a tooth with the face of each tooth located off center with respect to each tooth on the ratchet to thereby permit engagement by each pawl tooth of the opposite face of each ratchet tooth and effect bidirectional rotation of the ratchet.

* * * * *